(12) United States Patent
Li et al.

(10) Patent No.: US 10,379,816 B2
(45) Date of Patent: Aug. 13, 2019

(54) DATA ACCUMULATION APPARATUS AND METHOD, AND DIGITAL SIGNAL PROCESSING DEVICE

(71) Applicant: Institute of Computing Technology, Chinese Academy of Sciences, Beijing (CN)

(72) Inventors: Zhen Li, Beijing (CN); Shaoli Liu, Beijing (CN); Shijin Zhang, Beijing (CN); Tao Luo, Beijing (CN); Cheng Qian, Beijing (CN); Yunji Chen, Beijing (CN); Tianshi Chen, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/773,973

(22) PCT Filed: Jun. 17, 2016

(86) PCT No.: PCT/CN2016/086099
§ 371 (c)(1),
(2) Date: May 4, 2018

(87) PCT Pub. No.: WO2017/092283
PCT Pub. Date: Jun. 8, 2017

(65) Prior Publication Data
US 2018/0321912 A1    Nov. 8, 2018

(30) Foreign Application Priority Data

Dec. 1, 2015  (CN) .......................... 2015 1 0862723

(51) Int. Cl.
*G06F 7/509*   (2006.01)
*G06F 16/22*   (2019.01)
*G06F 7/50*    (2006.01)

(52) U.S. Cl.
CPC .............. *G06F 7/5095* (2013.01); *G06F 7/50* (2013.01); *G06F 16/2246* (2019.01)

(58) Field of Classification Search
None
See application file for complete search history.

(56) References Cited

U.S. PATENT DOCUMENTS 5,058,144 A * 10/1991 Fiala .......................... G06T 9/40
    341/79
5,452,375 A *  9/1995 Rousseau ................. G06K 9/56
    382/302

(Continued)

FOREIGN PATENT DOCUMENTS

CN    101859241 A    10/2010
CN    102033732 A     4/2011

(Continued)

OTHER PUBLICATIONS

International Search Report dated Sep. 20, 2016, in related PCT Application No. PCT/CN2016/086099.

*Primary Examiner* — Michael D. Yaary
(74) *Attorney, Agent, or Firm* — Maschoff Brennan

(57) ABSTRACT

The present disclosure provides a data accumulation device and method, and a digital signal processing device. The device comprises: an accumulation tree module for accumulating input data in the form of a binary tree structure and outputting accumulated result data; a register module including a plurality of groups of registers and used for registering intermediate data generated by the accumulation tree module during an accumulation process and the accumulated result data; and a control circuit for generating a data gating (Continued)

signal to control the accumulation tree module to filter the input data not required to be accumulated, and generating a flag signal to perform the following control: selecting a result obtained after adding one or more of intermediate data stored in the register to the accumulated result as output data, or directly selecting the accumulated result as output data. Thus, a plurality of groups of input data can be rapidly accumulated to a group of sums in a clock cycle. At the same time, the accumulation device can flexibly select to simultaneously accumulate some data of the plurality of input data by means of a control signal.

19 Claims, 3 Drawing Sheets

(56) References Cited

U.S. PATENT DOCUMENTS

| | | | | |
|---|---|---|---|---|
| 5,504,915 A * | 4/1996 | Rarick | ................. | G06F 7/5318 708/708 |
| 6,247,036 B1 * | 6/2001 | Landers | ................. | G06F 7/49 708/603 |
| 6,421,698 B1 * | 7/2002 | Hong | ................. | G06T 1/20 708/490 |
| 6,430,589 B1 * | 8/2002 | Jennings, III | ................. | G06F 7/5443 708/523 |
| 6,571,268 B1 * | 5/2003 | Giacalone | ................. | G06F 5/01 708/524 |

FOREIGN PATENT DOCUMENTS

| | | |
|---|---|---|
| CN | 102495719 A | 6/2012 |
| CN | 103176767 A | 6/2013 |
| CN | 103294446 A | 9/2013 |
| CN | 103365822 A | 10/2013 |
| CN | 105528191 A | 4/2016 |

* cited by examiner

DATA ACCUMULATION APPARATUS AND METHOD, AND DIGITAL SIGNAL PROCESSING DEVICE

TECHNICAL FIELD

The present disclosure belongs to the computer electronics field, and relates to a data accumulation device, a data accumulation method and a digital signal processing device which are capable of accumulating N input data to a sum data within a delay of a $\log_2 N$ level adder device.

BACKGROUND

Currently, a real-time digital signal processing technology is widely applied in the fields, such as, multimedia playing, network transaction processing, system control, image recognition and image processing, etc. Thus, more and more electronic products oriented to these fields use a digital signal processor, associated algorithm and its optimization system. Sub-operations related in various digital processing systems comprise Fourier transformation, convolution and matrix multiplication, and these operations mostly include an accumulation operation.

However, it is obviously not a good idea to achieve an accumulation operation directly on a software level. On one hand, it has to invocate processor resources, and when the processor resources are not available, this type of operation cannot be carried out; on the other hand, when the processor resources are invocated, this type of operation will consume large power consumption, while having low calculating efficiency.

Although a distributed system may accelerate the accumulation operation to a certain degree, communication overhead for delivering information will occupy the processor resources, and according to Amdahl's law, when a parallel part of an algorithm is speeded up to a certain degree, a serial part an algorithm (such as, communication, etc.) will become a bottleneck of the algorithm.

At current stage, in order to achieve the hardware specific accumulation operation, industrial and academic circles have proposed various accumulation circuits. However, the number of data accumulated each time is fixed.

The patent document 1 (publication No.: CN103294446A) proposes a fixed-point multiply-accumulator, wherein accumulated data are fixed-point numbers, and can be only viewed as four N-bit width data, two 2N-bit width data, or one 4N-bit width data; even so, the number of data accumulated by the hardware once can only be a few fixed patterns, and the functions are specialized. Meanwhile, the device is complicated in logic, has high transmission delay, and does not facilitate improving a basic frequency of the chip.

Thus, it is of great importance for an accumulation device with a high degree of flexibility and parallelism and low latency to improve a throughput of the digital processing system, and it can be widely used. The digital signal processing algorithm, such as, neural network and video decoding, which are often real-time, has a high requirement for operation performance and throughput. Meanwhile, accumulation conditions in the digital signal processing algorithm vary, the number of accumulated data may be any value, positions of the accumulated data are varied, and the accumulation operation has a high requirement for flexibility.

SUMMARY

Considering this, on the basis of studying the algorithm and the accumulation operation that are widely used in the existing digital signal processing system and interpreting the required resources, an object of the present disclosure is to provide an accumulation device with a high performance and flexibility by using an accumulation tree structure, which achieves accumulation of N data within a time delay of a $\log_2 N$ level adder.

The present disclosure discloses an accumulation device, which supports flexibly selecting to accumulate some data in N data to a sum in one operation, comprising:

an accumulation tree module for accumulating input data to partial sum data in the form of a tree structure;

a register module including a plurality of groups of registers for storing the partial sum data; and a control module, the control module comprising:

a gating signal generation circuit for generating a data gating signal to control the accumulation tree module to filter the input data not required to be accumulated;

a data register signal generation circuit for generating a data register selection signal to control a storage position of the partial sum data in the register module;

a data read signal generation circuit for generating a data read selection signal to select one or more of the partial sum data registered in one register of the register module; and a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal.

As regards to the data accumulation device of the present disclosure, the tree structure is a binary tree structure or a Wallace tree structure.

As regards to the data accumulation device of the present disclosure, the binary tree structure has an adder at each of nodes, except leaf nodes, and the adder at a parent node adds data of two child nodes of the parent node, and obtains the partial sum data at a root node of the binary tree.

As regards to the data accumulation device of the present disclosure, a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

As regards to the data accumulation device of the present disclosure, when the input data are fixed-point numbers, an accuracy of the parent node in the binary tree structure is one bit higher than a node with a higher accuracy in two child nodes of the parent node.

As regards to the data accumulation device of the present disclosure, the input data comprises floating-point numbers, fixed-point numbers, signed numbers, unsigned numbers, integers and/or real numbers.

In addition, the present disclosure further provides a data accumulation means by using data accumulation device, wherein, the data accumulation device, comprising:

an accumulation tree module for accumulating input data to partial sum data in the form of a tree structure;

a register module including a plurality of groups of registers for storing the partial sum data; and a control module, the control module comprising:

a gating signal generation circuit for generating a data gating signal to control the accumulation tree module to filter the input data not required to be accumulated;

a data register signal generation circuit for generating a data register selection signal to control a storage position of the partial sum data in the register module;

a data read signal generation circuit for generating a data read selection signal to select one or more of the partial sum data registered in one register of the register module; and a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal;

the data accumulation means, comprising:

step 1, in which a gating signal generation circuit of a control circuit generates and transmits a data gating signal to an accumulation tree module;

step 2, in which the accumulation tree module judges which input data are required to be accumulated, and accumulates the input data required to be accumulated to partial sum data in the form of a tree structure based on the data gating signal;

step 3, in which a data register signal generation circuit of the control circuit generates and transmits a data register selection signal to a register module, and based on the data register selection signal, the register module registers the partial sum data in a register selected by the data register selection signal;

step 4, in which a data read signal generation circuit of the control circuit generates and transmits a data read selection signal to the register module to select one or more of the partial sum data registered in one register of the register module;

step 5, in which a flag signal generation circuit of the control circuit generates a flag signal to perform accumulation and selection control, which outputs a result obtained after adding the partial sum data selected by the data read selection signal to the partial sum data output from the accumulation tree module in a current clock cycle as updated partial sum data, or directly outputs the partial sum data output from the accumulation tree module in the current clock cycle, wherein the output data are selected to be registered in the register, or output to an external memory based on control of the flag signal and the data register selection signal; and step 6, in which the output data are selected to be registered in the register, or output to an external memory based on control of the flag signal and the data register selection signal.

As regards to the data accumulation means by using data accumulation device of the present disclosure, in the step 5, the accumulation and selection control is further as follows:

if a flag has the first value, outputting the result obtained after adding the partial sum data selected by the data read selection signal to the partial sum data output from the accumulation tree module in the current clock cycle as the updated partial sum data;

if the flag has the second value, directly outputting the partial sum data output from the accumulation tree module in the current clock cycle.

As regards to the data accumulation means by using data accumulation device of the present disclosure, the tree structure is a binary tree structure or a Wallace tree structure.

As regards to the data accumulation means by using data accumulation device of the present disclosure, a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

As regards to the data accumulation means by using data accumulation device of the present disclosure, when the input data are fixed-point numbers, an accuracy of a parent node in the binary tree structure is one bit higher than a node with a higher accuracy in two child nodes of the parent node.

In addition, the present disclosure further provides a digital signal processing device comprising the data accumulation device, wherein, the data accumulation device, comprising:

an accumulation tree module for accumulating input data to partial sum data in the form of a tree structure;

a register module including a plurality of groups of registers for storing the partial sum data; and a control module, the control module comprising:

a gating signal generation circuit for generating a data gating signal to control the accumulation tree module to filter the input data not required to be accumulated;

a data register signal generation circuit for generating a data register selection signal to control a storage position of the partial sum data in the register module;

a data read signal generation circuit for generating a data read selection signal to select one or more of the partial sum data registered in one register of the register module; and a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal.

As regards to the digital signal processing device comprising the data accumulation device of the present disclosure, the digital signal processing device is a digital signal processor, a digital signal processing chip, a graphics processing unit, or a video decoder.

As regards to the digital signal processing device comprising the data accumulation device of the present disclosure, wherein the tree structure is a binary tree structure or a Wallace tree structure.

As regards to the digital signal processing device comprising the data accumulation device of the present disclosure, a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

As regards to the digital signal processing device comprising the data accumulation device of the present disclosure, when the input data are fixed-point numbers, an accuracy of a parent node in the binary tree structure is one bit higher than a node with a higher accuracy in two child nodes of the parent node.

In addition, the present disclosure further provides a digital signal processing means by using data accumulation device, wherein, the data accumulation device, comprising:

an accumulation tree module for accumulating input data to partial sum data in the form of a tree structure;

a register module including a plurality of groups of registers for storing the partial sum data; and a control module, the control module comprising:

a gating signal generation circuit for generating a data gating signal to control the accumulation tree module to filter the input data not required to be accumulated;

a data register signal generation circuit for generating a data register selection signal to control a storage position of the partial sum data in the register module;

a data read signal generation circuit for generating a data read selection signal to select one or more of the partial sum data registered in one register of the register module; and a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal;

the digital signal processing means, comprising:

step 1, in which a gating signal generation circuit of a control circuit generates and transmits a data gating signal to an accumulation tree module;

step 2, in which the accumulation tree module judges which input data are required to be accumulated, and accumulates the input data required to be accumulated to partial sum data in the form of a tree structure based on the data gating signal;

step 3, in which a data register signal generation circuit of the control circuit generates and transmits a data register selection signal to a register module, and based on the data register selection signal, the register module registers the partial sum data in a register selected by the data register selection signal;

step 4, in which a data read signal generation circuit of the control circuit generates and transmits a data read selection signal to the register module to select one or more of the partial sum data registered in one register of the register module;

step 5, in which a flag signal generation circuit of the control circuit generates a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal; and step 6, in which the output data are selected to be registered in the register, or output to an external memory based on control of the flag signal and the data register selection signal.

As regards to the digital signal processing means by using data accumulation device of the present disclosure, wherein the tree structure is a binary tree structure or a Wallace tree structure.

As regards to the digital signal processing means by using data accumulation device of the present disclosure, a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

As regards to the digital signal processing means by using data accumulation device of the present disclosure, when the input data are fixed-point numbers, an accuracy of a parent node in the binary tree structure is one bit higher than a node with a higher accuracy in two child nodes of the parent node.

As regards to the digital signal processing means by using data accumulation device of the present disclosure, in the step 5, the accumulation and selection control is further as follows:

if a flag has the first value, outputting the result obtained after adding the partial sum data selected by the data read selection signal to the partial sum data output from the accumulation tree module in the current clock cycle as the updated partial sum data;

if the flag has the second value, directly outputting the partial sum data output from the accumulation tree module in the current clock cycle.

DETAILED DESCRIPTION

The accumulation device of the present disclosure can select some data in N data to accumulate the data to a sum in one operation. The device has a high degree of flexibility and parallelism and low latency in accumulation, and has a wide use range in the digital processing algorithm having a high requirement for real-time performance, such as, neural network and video decoding.

In order to make the object, the technical solution and advantages of the present disclosure much clearer, the data accumulation device and data accumulation method of the present disclosure are further explained in detail below with reference to the drawings.

The data types which can be supported by the accumulation device of the present disclosure include signed number, unsigned number, integer, real number and negative number. In the accumulation device of the present disclosure, an accumulation tree has N input leaf nodes, and M registers are provided for storing an intermediate partial sum. Some of the data on the N input leaf nodes can be selected by a control signal to be added by the accumulation tree, the added result is added or not added to the value in one of the M registers for storing the intermediate partial sum to obtain an updated partial sum, and the updated partial sum may be optionally stored in one of the M registers for storing the intermediate partial sum.

Figure 1:
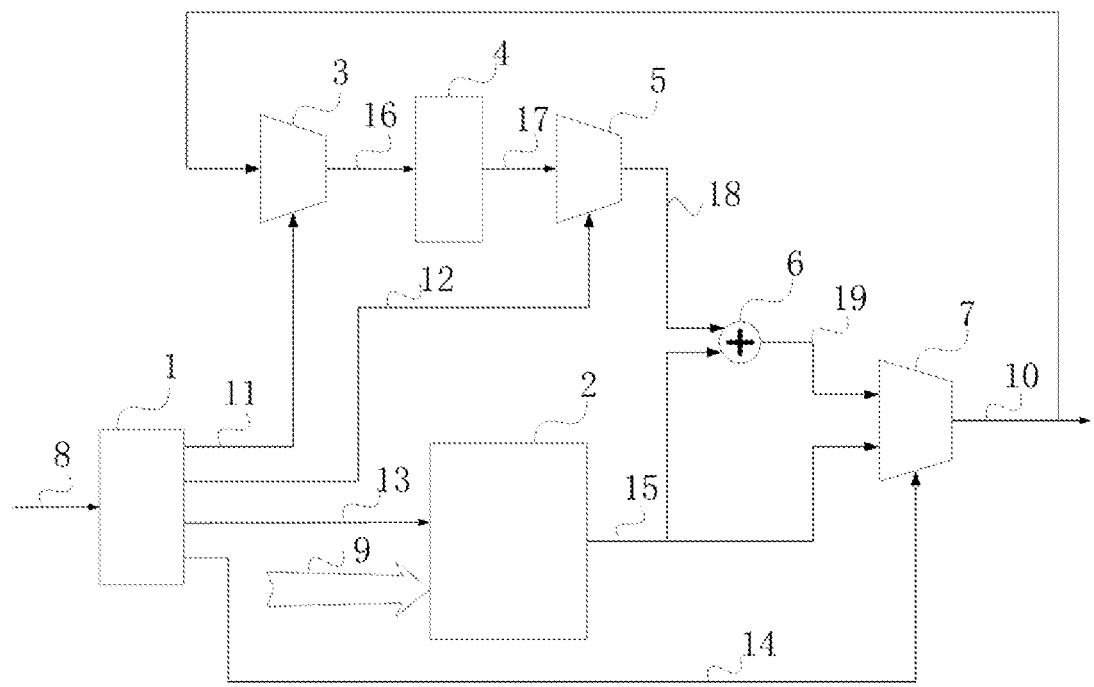
FIG. 1 illustrates a structure diagram of a data accumulation device of an embodiment of the present disclosure.

FIG. 1 illustrates a structure diagram of an accumulation device of an embodiment of the present disclosure. As shown in FIG. 1, the accumulation device comprises an encode control circuit 1, an accumulation tree module 2, a multiplexer 3, an intermediate value storage register group 4, a multiplexer 5, an adder 6, and a 2:1 multiplexer. The accumulation device supports accumulation of a plurality of fixed-point or floating-point data. Moreover, an input data register may be provided to store input data stream 9, and the parts (which may be understood as reference sign 8 in FIG. 1) for accumulating a plurality of data may be referred to the input data register in an instruction.

Figure 2:
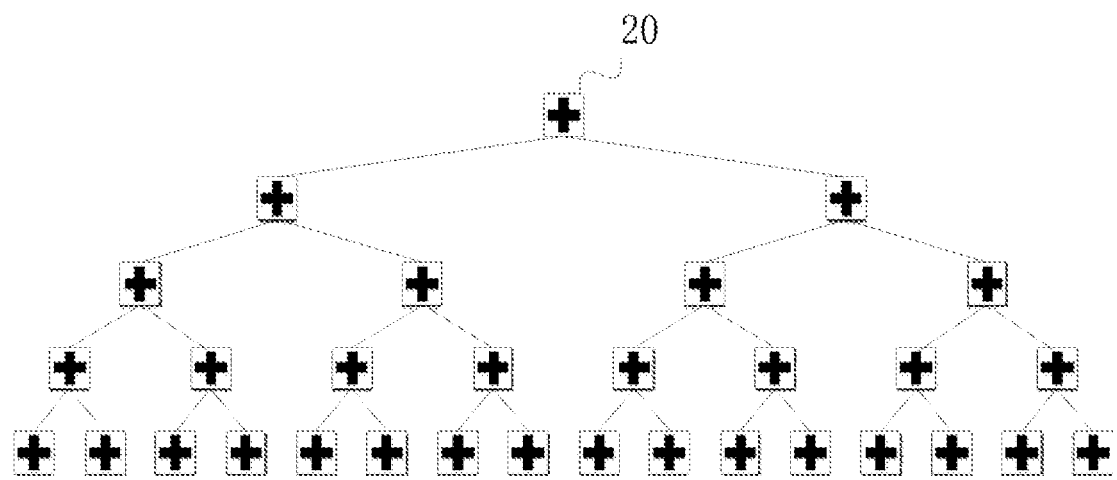
FIG. 2 illustrates an overview of a binary tree structure used in the present disclosure.

The accumulation tree module 2 is configured to rapidly accumulate a plurality of input data to an intermediate partial sum in response to a control signal. The accumulation tree module 2 may have a typical binary tree structure, and is adapted to accumulation of a plurality of floating-point numbers or fixed-point numbers. As shown in FIG. 2, except leaf nodes of the tree, each of nodes has an adder 20, each parent node adds data of two child nodes, and a sum of an accumulation tree is obtained at a root node of the tree. By means of a pattern of a binary tree structure, the accumulation tree can calculate an accumulated result of a plurality of data within the quickest time, and performance of the device is improved. In FIG. 2, each of the leaf nodes of the accumulation tree is provided with a control signal generated by one-bit controller, and the control signal is configured to indicate whether input data at the leaf node is required to be accumulated. By means of this method, the present disclosure can achieve a flexible accumulation way. In addition, when the binary accumulation tree structure is configured to process the fixed-point numbers, an accuracy of each parent node is one bit higher than a higher accuracy in two child nodes. For example, in the binary tree, accuracies of two child nodes of one node are X and Y bits, respectively, and X≥Y, an accuracy of the node is (X+1) bit, and accumulation of the fixed-point numbers with different accuracies can be achieved, while achieving accumulation using minimum logic gates (including "AND", "OR", "NOT") without loss of data accuracy. In addition, the accumulation tree module 2 may be divided into a plurality of pipeline stages because of requirements for chip process or chip frequency, and the register control signals for the registers are also provided, for example, since the accumulation tree is hierarchical, different levels may be viewed as different pipeline stages, and a register is inserted between different levels to register sum data produced during a data accumulation process. As shown in FIG. 1, the input data stream 9 is input to the accumulation tree module 2, such that the accumulation tree module 2 accumulates the input data stream 9, and the accumulation tree module 2 simultaneously accumulates N data which need to be accumulated to an accumulated result data in a delay of $\log_2 N$ level adder, wherein "a delay of $\log_2 N$ level adder" means, since an adder tree in the schematic diagram of the adder tree of FIG. 2 is hierarchical, a delay of one adder represents time required for an output obtained by adding two data with two adders.

Further, the input data stream 9 comprises a plurality of signed number, unsigned number, integer, real number, negative number, fixed-point number, floating-point number, etc., and supports SIMD or MIMD, such that the existing data processing algorithms can be implemented on the accumulation device efficiently.

The control circuit 1, functioning as a decode unit, comprises a data register signal generation circuit; a data read signal generation circuit, a gating signal generation circuit, and a flag signal generation circuit, which are configured to encode a signal 8 in response to a control signal in an instruction, and produce corresponding control signals including a result_select signal 11 (corresponding to a data register selection signal in the claim), a source_select signal 12 (corresponding to a data read selection signal in the claim), an adder tree input data gating signal 13, and a flag signal 14 to control the accumulation tree module 2, the multiplexer 3, the intermediate value storage register group 4, the multiplexer 5, the adder 6, and the duplexer 7; wherein the result_select signal 11 is obtained by interpreting the parts for accumulating the plurality of data correspondingly in an instruction, and is configured to select a register (which is included in the intermediate value storage register group 4) for storing the intermediate partial sum calculated by accumulation to register the accumulated result; the source_select signal 12 is obtained by interpreting the parts for accumulating the plurality of data correspondingly in an instruction, has a practical meaning when a flag has the first value, and is configured to select a register for storing the intermediate partial sum calculated by accumulation to be add to an accumulation sum of the accumulation tree, wherein "the first value" may be interpreted according to an input control instruction, and is some values (which may be set by the programmer) that represent intermediate values required to be accumulated in an instruction code. When the intermediate values are required to be accumulated, it can be interpreted from an instruction which register is accumulated, and also can be interpreted that the intermediate values of the accumulated result shall be registered in which register. The number of values of the source_select 12 and the result_select 11 is not less than the number of registers in the intermediate value storage register group for storing the intermediate partial sum calculated by accumulation each time to ensure that at least one value is assigned to each register, such that the circumstance in which some registers in the can not be accessed while read or write operations is being performed in the accumulation device will not occur, and the source_select 12 and the result_select 11 may have different values, which represents that the register selected to be add to the accumulation tree result is different from the register for storing an addition result; the flag is obtained by interpreting the parts for accumulating the plurality of data correspondingly in an instruction, and functions to judge whether the accumulation sum calculated by the accumulation tree shall be added to the register which is selected by the source_select signal and used for storing the intermediate partial sum calculated by accumulation, and if the flag has the first value, addition is required; otherwise, if the flag has the second value, addition is not required, wherein "the second value" may be interpreted according to the input control instruction, and is some values (which may be set by the programmer) that represent intermediate values not required to be accumulated in the instruction code. In addition, the data gating signal 13 is input to filter the input data not required to be accumulated, thereby the addition function that some of the data on the N input leaf nodes are to be added by the accumulation tree is supported. For example, the 0th and the (N−1)th input data are not required to be accumulated, and by means of this way, a flexible data accumulation can be achieved. The specific solution is: the user configures a circuit to generate a plurality of groups of N-bit width gating signals in advance, and 1 bit in each group of gating signals indicate whether a date on one leaf node of the adder tree structure in FIG. 2 is required to be accumulated. For example, supposing that the accumulation tree has eight leaf nodes, and the corresponding gating signals has 8 bits, inputs to the leaf nodes are $x_0$, $x_1$, $x_2$, $x_3$, $x_4$, $x_5$, $x_6$, and $x_7$, respectively, and the accumulation way is shown in Table 1.

TABLE 1

| Gating signals | Input data required to be accumulated |
|---|---|
| 8'b00000000 | None |
| 8'b00000001 | $x_0$ |
| 8'b00000010 | $x_1$ |
| 8'b00000011 | $x_1$, $x_0$ |
| 8'b00000100 | $x_2$ |
| . . . | . . . |
| 8'b11111101 | $x_7$, $x_6$, $x_5$, $x_4$, $x_3$, $x_2$, $x_0$ |
| 8'b11111110 | $x_7$, $x_6$, $x_5$, $x_4$, $x_3$, $x_2$, $x_1$ |
| 8'b11111111 | $x_7$, $x_6$, $x_5$, $x_4$, $x_3$, $x_2$, $x_1$, $x_0$ |

(Note:
ellipse in the table omits other fifty-six conditions, specifically, the part of the gating signal from five to sixty according to a binary code)
As can be known from Table 1, there are a total of $2^N$ accumulation ways for an adder tree having N leaf nodes.

Further, the intermediate value storage register group 4 in FIG. 1 comprises a plurality of registers for storing the intermediate partial sum calculated by accumulation each time. In a data processing device, a register can be selected to be added to an accumulation sum of the accumulation tree by means of the control signals, and one register can also be selected to store the accumulated intermediate partial sum by means of the control signals, wherein the control signals refer to the result_select 11, the source_select 12 and the flag signal 14.

The multiplexer 3 is configured to select one register in the M registers for storing the intermediate partial sum in response to the result_select 11, and register the updated partial sum in the selected register, i.e., in the register selected from the intermediate value storage register group 4.

The multiplexer 5 is configured to select the register value 17 of one register from the M registers for storing the intermediate partial sum in response to the source_select 12, and the selected register value 18 may be added to the accumulation tree result to obtain the update partial sum.

The duplexer 7 is configured to control the duplexer to select the accumulation tree result 15, or a result obtained by adding the accumulation tree result 15 to the register value 18 selected by the multiplexer as the update partial sum 10 in response to the flag signal.

Still further, as have mentioned above, as for accumulation of the fixed-point number, the accuracy is expanded according to signed/unsigned number of a data and bit width of the data, and in the binary accumulation tree structure, an accuracy of each parent node is one bit higher than a higher accuracy in two child nodes. In addition, when being used for processing accumulation of a plurality of fixed-point data, the accumulation device may change the binary tree structure of the accumulation tree to a Wallace tree structure.

In the accumulation device of the present disclosure, calculation of a plurality of groups of accumulated results can be performed without interfering with each other, a part of different data in N data can be selected to be accumulated by changing the control signals from the control circuit, and then the accumulation partial sum is stored in different registers for storing the intermediate partial sum to achieve the calculation of different output results with respect to the same input data.

Take calculation of a Local Response Normalization (LRN) layer in a Convolutional Neural Network (CNN) algorithm for example:

In the CNN algorithm, an input and output mapping formula of the LRN layer is:

$$O_z^{(x,y)} = I_z^{(x,y)} * f\left(\sum_{k=z-l/2}^{z+l/2} I_k^{(x,y)^2}\right) \quad (1)$$

wherein, $I_k^{(x,y)}$ is a value of a neuron at a coordinate (x, y) on the kth feature map in the input data of the LRN layer, $O_z^{(x,y)}$ is a value of a neuron at the coordinate (x, y) on the zth feature map in the output data of the LRN layer, and f(•) represents a nonlinear transformation. The specific meaning of the formula is that the value of the neuron at the coordinate (x, y) on the zth feature map in the output data of the LRN layer equals to a quadratic sum of values of the neurons at the same coordinate on one feature map belonging to a range of [z−½, z+½] in the input data multiplying by the value of the neuron at the coordinate (x, y) on the zth feature map in the input data. Thus, in order to calculate each of the output data of the LRN layer, accumulation of one piece of data must be performed.

Here, the calculation is performed by using the MIMD method. Supposing that there are n groups of accumulation devices, and there are n inputs for the accumulation tree of an accumulation device. Each of the accumulation devices calculate outputs of the coordinate value z with an interval n. Without loss of generality, supposing that the input coordinate value z belongs to [1, N], and 1<n<N, an input of N at the position (x, y) is grouped by dividing n inputs into a group, and the final group may be less than n inputs.

Figure 3:
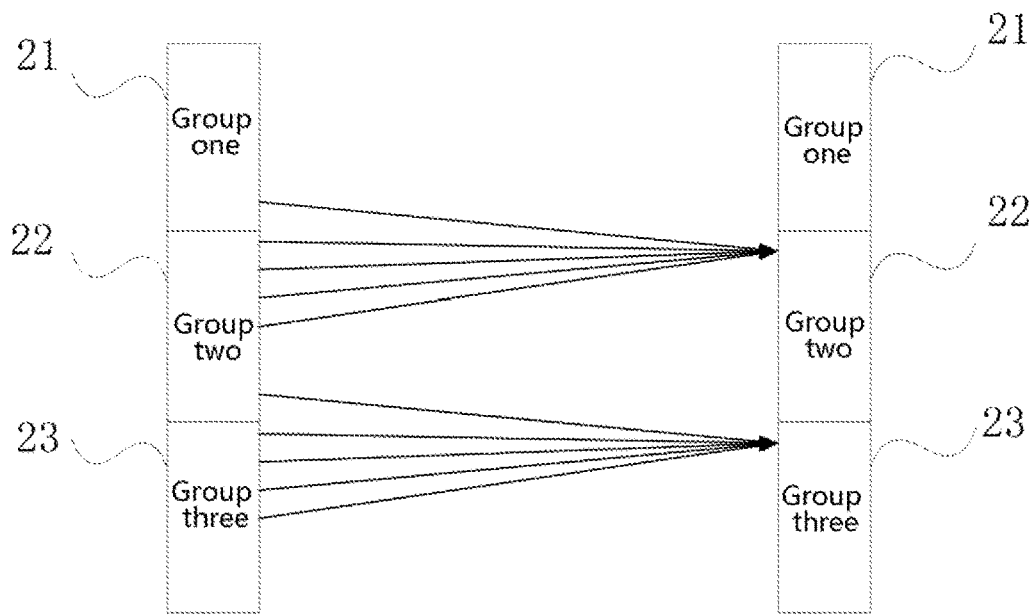
FIG. 3 is a schematic diagram of input and output relations of a LRN layer operation of an embodiment of the present disclosure.

FIG. 3 is a schematic diagram of input and output mapping of one accumulation calculation in the n groups of accumulation devices when calculation is performed on the LRN layer. In the figure, the left is the square of input data arranged according to the feature map, and is grouped according to the above method (the figure shows three groups); positions pointed by arrows on the right are the second and third accumulation output results to be calculated by the device.

When the second group is input, different parts of the second group may be used for calculating the second and third accumulated results, respectively. In order to repeatedly use data, and reduce storage overhead, when the second group is input, the partial sum for calculating the second accumulated result selected by the control signal may be accumulated by the accumulation tree, and then add to the partial sum of the second accumulated result stored in the register for storing the intermediate result to calculate the second accumulated result. Next, the partial sum for calculating the third accumulated result selected by the control signal is calculated by the accumulation tree to calculate the partial sum, and then the partial sum is registered in one intermediate result register.

Figure 4:
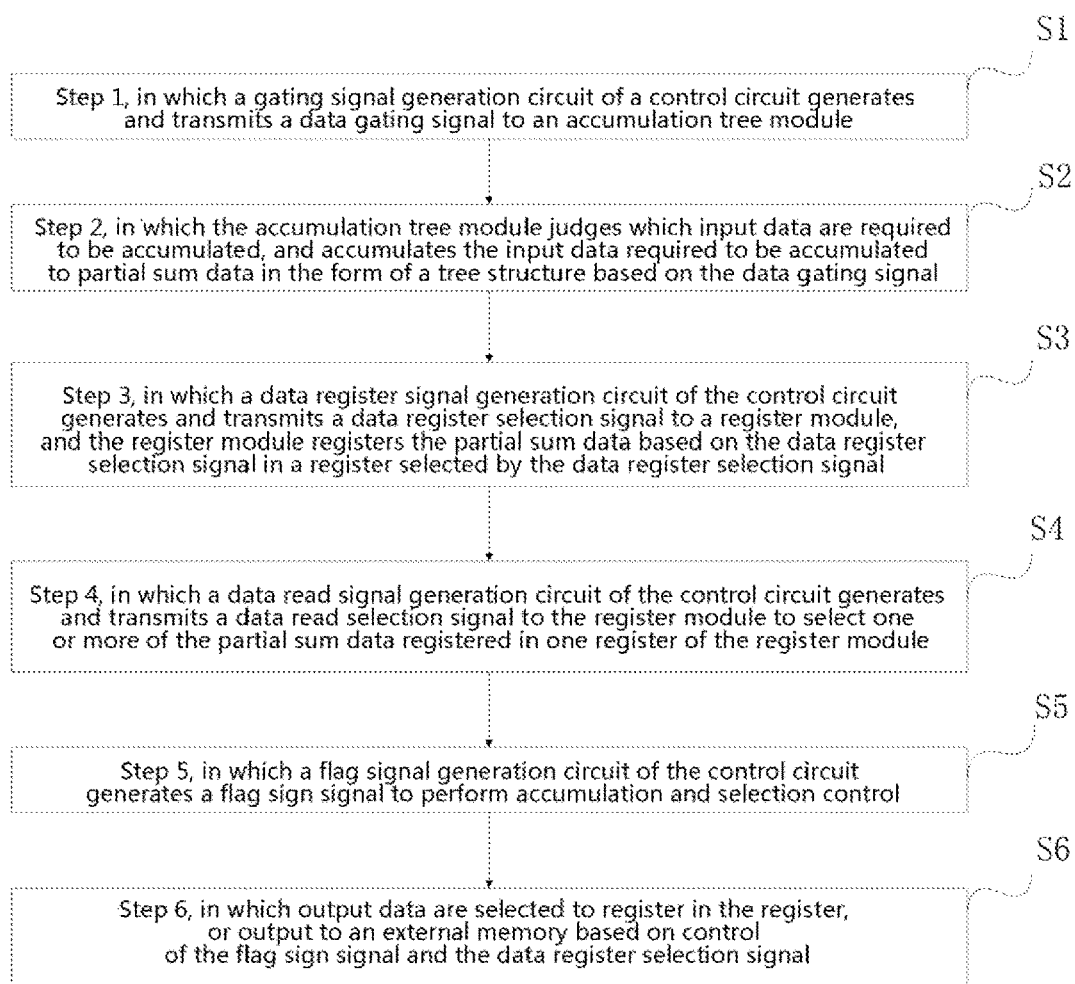
FIG. 4 illustrates a data accumulation method using the data accumulation device of the present disclosure.

In addition, the present disclosure further provides a data accumulation method. As shown in FIG. 4, it comprises the following steps:

step 1, in which a gating signal generation circuit of a control circuit generates and transmits a data gating signal to an accumulation tree module;

step 2, in which the accumulation tree module judges which input data are required to be accumulated, and accumulates the input data required to be accumulated to partial sum data in the form of a tree structure based on the data gating signal;

step 3, in which a data register signal generation circuit of the control circuit generates and transmits a data register selection signal to a register module, and based on the data register selection signal, the register module registers the partial sum data in a register selected by the data register selection signal;

step 4, in which a data read signal generation circuit of the control circuit generates and transmits a data read selection signal to the register module to select one or more of the partial sum data registered in one register of the register module;

step 5, in which a flag signal generation circuit of the control circuit generates a flag signal to perform an accumulation and selection control, the accumulation and selection control outputs a result obtained after adding the partial sum data selected by the data read selection signal to the partial sum data output from the accumulation tree module in a current clock cycle as updated partial sum data, or directly outputs the partial sum data output from the accumulation tree module in the current clock cycle, wherein the output data are selected to be registered in the register, or output to an external memory based on control of the flag signal and the data register selection signal; and step 6, in which the output data are selected to be registered in the register, or output to an external memory based on control of the flag signal and the data register selection signal.

As regards to the data accumulation method of the present disclosure, in the step 5, the accumulation and selection control is further as follows:

if a flag has the first value, outputting the result obtained after adding the partial sum data selected by the data read selection signal to the partial sum data output from the accumulation tree module in the current clock cycle as the updated partial sum data;

if the flag has the second value, directly outputting the partial sum data output from the accumulation tree module in the current clock cycle.

Figure 5:
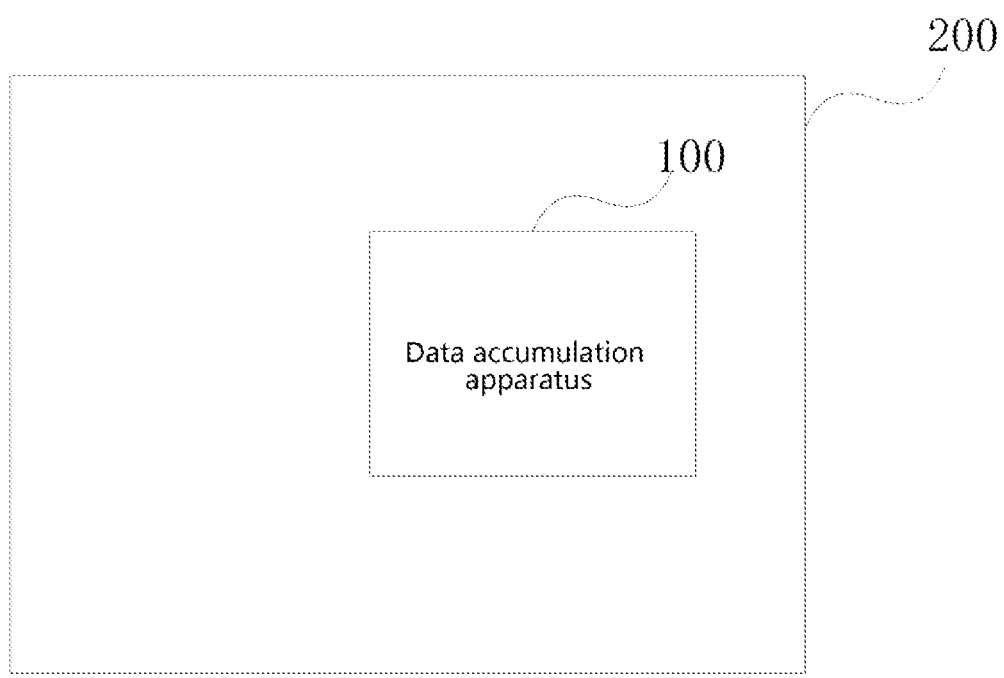
FIG. 5 illustrates a digital signal processing device of an embodiment of the present disclosure.

In addition, as shown in FIG. 5, the present disclosure further provides a digital signal processing device 200 comprising a data accumulation device 100 of the present disclosure. The digital signal processing device 200 may be, such as, a digital signal processor, a digital signal processing chip, a graphics processing unit, and a video decoder, and applied to the fields, such as, graphics processing, multimedia playing, network transaction processing, and pattern recognition, etc. In addition, the present disclosure further provides a digital signal processing method comprising the above data accumulation method.

In addition, it shall be noted that the "instructions" in the present disclosure refers to computer program instructions. These computer program instructions may be stored in a readable memory of the computer that can guide the computer, or other programmable data processing device to work in a specific way, such that the instructions stored in the readable memory of the computer produce a manufactured product including a command device which achieves the specified function in one or more flows of the flow chart, and/or one or more blocks of the block diagram.

These computer program instructions may also be loaded to the computer, or other programmable data processing device to execute a series of operation steps on the computer, or other programmable device to produce processing implemented by the computer, such that the instructions executed on the computer, or other programmable device provide steps for achieving the specified function in one or more flows of the flow chart, and/or one or more blocks of the block diagram. The accumulation device provided by the present disclosure comprises an adder tree, and can rapidly accumulate a plurality of groups of input data to a group of sums in a clock cycle. Meanwhile, the accumulation device can flexibly select to simultaneously accumulate partial data of the plurality of input data by means of a control signal. In addition, the device provides an intermediate value storage way, and the intermediate value can be stored in the register group selected by the data register selection signal transmitted by the control circuit, and can be accessed by an encode unit; access overhead of the accumulation device can be saved through this intermediate value storage device.

The invention claimed is:

1. A data accumulation device, comprising:
an accumulation tree module for accumulating input data to partial sum data in the form of a tree structure;
a register module including a plurality of groups of registers for storing the partial sum data; and
a control module, the control module comprising:
a gating signal generation circuit for generating a data gating signal to control the accumulation tree module to filter the input data not required to be accumulated;
a data register signal generation circuit for generating a data register selection signal to control a storage position of the partial sum data in the register module;
a data read signal generation circuit for generating a data read selection signal to select one or more of the partial sum data registered in one register of the register module; and
a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal.

2. The data accumulation device according to claim 1, wherein the tree structure is a binary tree structure or a Wallace tree structure.

3. The data accumulation device according to claim 2, wherein,
a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

4. The data accumulation device according to claim 2, wherein,
when the input data are fixed-point numbers, an accuracy of a parent node in the binary tree structure is one bit higher than a node with a higher accuracy in two child nodes of the parent node.

5. A data accumulation means by using a data accumulation device, wherein the data accumulation device comprises:
an accumulation tree module for accumulating input data to partial sum data in the form of a tree structure;
a register module including a plurality of groups of registers for storing the partial sum data; and
a control module, the control module comprising:
a gating signal generation circuit for generating a data gating signal to control the accumulation tree module to filter the input data not required to be accumulated;
a data register signal generation circuit for generating a data register selection signal to control a storage position of the partial sum data in the register module;
a data read signal generation circuit for generating a data read selection signal to select one or more of the partial sum data registered in one register of the register module; and
a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal;
the data accumulation means, comprising:
step 1, in which a gating signal generation circuit of a control circuit generates and transmits a data gating signal to an accumulation tree module;
step 2, in which the accumulation tree module judges which input data are required to be accumulated, and accumulates the input data required to be accumulated to partial sum data in the form of a tree structure based on the data gating signal;
step 3, in which a data register signal generation circuit of the control circuit generates and transmits a data register selection signal to a register module, and based on the data register selection signal, the register module registers the partial sum data in a register selected by the data register selection signal;
step 4, in which a data read signal generation circuit of the control circuit generates and transmits a data read selection signal to the register module to select one or more of the partial sum data registered in one register of the register module;
step 5, in which a flag signal generation circuit of the control circuit generates a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal; and
step 6, in which the output data are selected to be registered in the register, or output to an external memory based on control of the flag signal and the data register selection signal.

6. The data accumulation means using the data accumulation device according to claim 5, wherein,
in the step 5, the accumulation and selection control is further as follows:
if a flag has the first value, outputting the result obtained after adding the partial sum data selected by the data read selection signal to the partial sum data output from the accumulation tree module in the current clock cycle as the updated partial sum data;
if the flag has the second value, directly outputting the partial sum data output from the accumulation tree module in the current clock cycle.

7. The data accumulation means by using the data accumulation device according to claim 5, wherein the tree structure is a binary tree structure or a Wallace tree structure.

8. The data accumulation means by using the data accumulation device according to claim 7, wherein,
a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

9. The data accumulation means by using the data accumulation device according to claim 7, wherein,
when the input data are fixed-point numbers, an accuracy of a parent node in the binary tree structure is one bit higher than a node with a higher accuracy in two child nodes of the parent node.

10. A digital signal processing device comprising the data accumulation device, wherein the data accumulation device comprises:
an accumulation tree module for accumulating input data to partial sum data in the form of a tree structure;
a register module including a plurality of groups of registers for storing the partial sum data; and
a control module, the control module comprising:
a gating signal generation circuit for generating a data gating signal to control the accumulation tree module to filter the input data not required to be accumulated;
a data register signal generation circuit for generating a data register selection signal to control a storage position of the partial sum data in the register module;
a data read signal generation circuit for generating a data read selection signal to select one or more of the partial sum data registered in one register of the register module; and
a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal.

11. The digital signal processing device comprising the data accumulation device according to claim 7, wherein the digital signal processing device is a digital signal processor, a digital signal processing chip, a graphics processing unit, or a video decoder.

12. The digital signal processing device comprising the data accumulation device according to claim 10, wherein the tree structure is a binary tree structure or a Wallace tree structure.

13. The digital signal processing device comprising the data accumulation device according to claim 12, wherein a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

14. The digital signal processing device comprising the data accumulation device according to claim 12, wherein when the input data are fixed-point numbers, an accuracy of a parent node in the binary tree structure is one bit higher than a node with a higher accuracy in two child nodes of the parent node.

15. A digital signal processing means by using a data accumulation device, wherein the data accumulation device comprises:
an accumulation tree module for accumulating input data to partial sum data in the form of a tree structure;
a register module including a plurality of groups of registers for storing the partial sum data; and
a control module, the control module comprising:
a gating signal generation circuit for generating a data gating signal to control the accumulation tree module to filter the input data not required to be accumulated;
a data register signal generation circuit for generating a data register selection signal to control a storage position of the partial sum data in the register module;
a data read signal generation circuit for generating a data read selection signal to select one or more of the partial sum data registered in one register of the register module; and
a flag signal generation circuit for generating a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal;

the digital signal processing means, comprising:
step 1, in which a gating signal generation circuit of a control circuit generates and transmits a data gating signal to an accumulation tree module;
step 2, in which the accumulation tree module judges which input data are required to be accumulated, and accumulates the input data required to be accumulated to partial sum data in the form of a tree structure based on the data gating signal;
step 3, in which a data register signal generation circuit of the control circuit generates and transmits a data register selection signal to a register module, and based on the data register selection signal, the register module registers the partial sum data in a register selected by the data register selection signal;
step 4, in which a data read signal generation circuit of the control circuit generates and transmits a data read selection signal to the register module to select one or more of the partial sum data registered in one register of the register module;
step 5, in which a flag signal generation circuit of the control circuit generates a flag signal to perform accumulation and selection control, so as to output a result obtained after adding the partial sum data selected by the data read selection signal to the partial sum data output from the accumulation tree module in a current clock cycle as updated partial sum data, or directly output the partial sum data output from the accumulation tree module in the current clock cycle, wherein the output data are selected to be registered in the register, or output to an external memory based on control of the flag signal and the data register selection signal; and
step 6, in which the output data are selected to be registered in the register, or output to an external memory based on control of the flag signal and the data register selection signal.

16. The digital signal processing means by using the data accumulation device according to claim 15, wherein the tree structure is a binary tree structure or a Wallace tree structure.

17. The digital signal processing means by using the data accumulation device according to claim 16, wherein a bit width of the data gating signal equals to the number of leaf nodes of the binary tree, each bit of the data gating signal corresponds to the data on one leaf node of the binary tree, and the data on the leaf nodes corresponding to one bit or more bits of the data gating signal are controlled not to be accumulated by invalidating the one bit or the more bits of the data gating signal.

18. The digital signal processing means by using the data accumulation device according to claim 16, wherein when the input data are fixed-point numbers, an accuracy of a parent node in the binary tree structure is one bit higher than a node with a higher accuracy in two child nodes of the parent node.

19. The digital signal processing means by using the data accumulation device according to claim 15, wherein in the step 5, the accumulation and selection control is further as follows:
if a flag has the first value, outputting the result obtained after adding the partial sum data selected by the data read selection signal to the partial sum data output from the accumulation tree module in the current clock cycle as the updated partial sum data;
if the flag has the second value, directly outputting the partial sum data output from the accumulation tree module in the current clock cycle.

* * * * *